United States Patent [19]
Brock, Jr. et al.

[11] 3,974,690
[45] Aug. 17, 1976

[54] METHOD OF AND APPARATUS FOR MEASURING ANNULUS PRESSURE IN A WELL

[75] Inventors: Bill M. Brock, Jr., Stafford; Leo Jude Marquette; Norman Allen Nelson, both of Houston, all of Tex.

[73] Assignee: Stewart & Stevenson Oiltools, Inc., Houston, Tex.

[22] Filed: Oct. 28, 1975

[21] Appl. No.: 625,974

[52] U.S. Cl. .............................. 73/151; 73/40.5 R
[51] Int. Cl.² .......................................... E21B 47/06
[58] Field of Search ........... 73/152, 151, 49.1, 49.5, 73/389, 40.5 R

[56] References Cited
UNITED STATES PATENTS

| | | | |
|---|---|---|---|
| 3,186,481 | 6/1965 | Foster | 73/152 UX |
| 3,199,598 | 8/1965 | Loomis | 73/49.1 X |

*Primary Examiner*—Jerry W. Myracle
*Attorney, Agent, or Firm*—Fulbright & Jaworski

[57] ABSTRACT

A method of and apparatus for measuring and monitoring the annulus pressure between coaxial well conduits by providing a pressure measuring means which is adapted to be positioned in the well in the annulus and which is movable in response to pressure, and measuring means measuring the movement of the movable pressure measuring means, and transmitting the measurement to the well surface. Pressure measuring means may include a movable element exposed to the pressure in the annulus and a pressure charge chamber acting on the element opposing the movement caused by the pressure in the annulus. The pressure chamber and movable elements may be annular and surround the exterior of the interior conduit. The measuring means includes sensor means adapted to be moved in the well in the interior of the interior conduit to a position adjacent but spaced from the pressure measuring means for providing measurements by signal waves. The measuring means may include a stop shoulder for location the measuring means at a predetermined location in the interior conduit.

9 Claims, 7 Drawing Figures

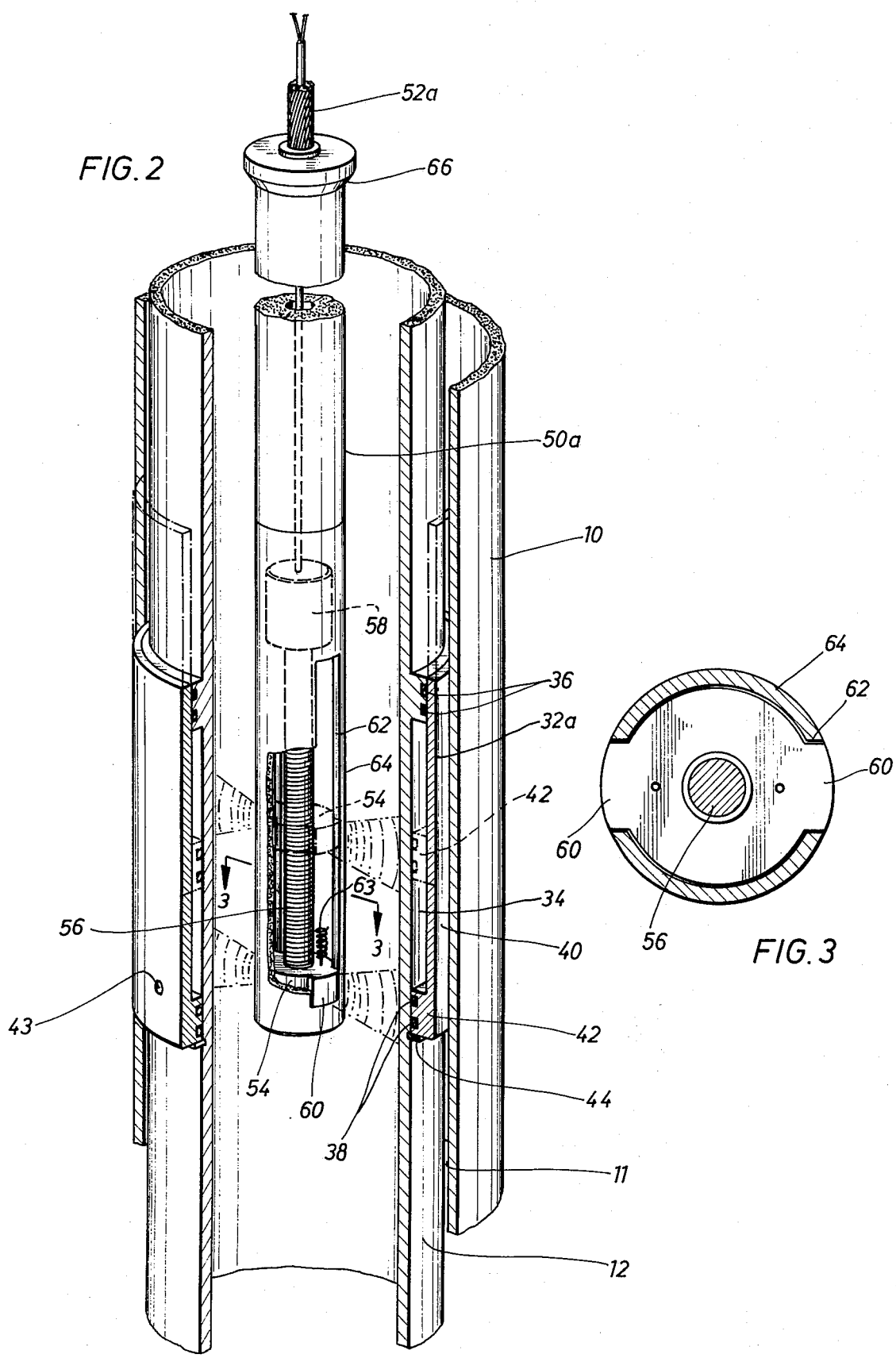

METHOD OF AND APPARATUS FOR MEASURING ANNULUS PRESSURE IN A WELL

BACKGROUND OF THE INVENTION

In a well coaxial conduits may be provided in a wellhead such as casing. A packoff seal is provided blocking off the flow through the annulus between the conduits in order to control the fluid therein. In order to test the packoff seal to determine whether or not the seal is correctly set, a testing plug is placed in the interior of the interior conduit, and as described in U.S. Pat. Nos. 2,951,363 and 3,872,713, pressure is applied to the top of the seal. If the pressure holds, the seal is good. If, however, the seal is not good, the pressure will pass around the seal and flow into the annulus between the two coaxial conduits and often collapse one of the conduits.

The present invention is directed to a method and apparatus for monitoring the annulus pressure between the coaxial well conduits to avoid undesirably high pressures in the annulus.

SUMMARY

The present invention is directed to a method of and apparatus for monitoring the annulus pressure between coaxial well conduits by providing pressure measuring means, which is movable in response to pressure positioned in the well in the annulus, and providing means for measuring the location of the movable pressure measuring means and transmitting the measurements to the well surface thereby providing at the well surface an indication of the pressure in the annulus.

Yet a still further object of the present invention is the provision of monitoring the pressure in the annulus below a packoff seal while testing the seal by applying fluid pressure to the top of the seal in order to avoid excessive pressure in the annulus below the seal.

Still a further object is the provision of a pressure measuring means which includes a movable element exposed to the pressure in the annulus and a pressure charge chamber acting on the movable element in a direction to move the element opposite to the movement caused by the pressure in the annulus. Preferably the pressure chamber and the element are annular and surround the exterior of the interior conduit.

A further object of the present invention is the provision of measuring means which includes sensor means for measuring the position of the movable pressure measuring means by transmitting or receiving signal waves and which is adapted to be moved in the well in the interior or interior conduit to a position adjacent the pressure measuring means. One form of the sensor means includes a plurality of vertically spaced sensors for measuring the position of the pressure measuring means. Another form of the sensor includes means for vertically moving the sensor for monitoring the position of the movable pressure measuring means. Furthermore, the measuring means may include a stop shoulder for engaging a shoulder in the interior of the interior conduit for placing the measuring means at a known predetermined location for measuring the movement of the pressure measuring means.

Still a further object of the present invention is the method of measuring the annulus pressure between two coaxial well conduits below a packoff seal blocking fluid flow through the annulus while testing the seal by inserting a pressure measuring means into the annulus and by applying fluid pressure to the top of the seal, measuring the pressure in the annulus from a position outside the annulus by signal waves while testing the seal, and transmitting the pressure measurement upwardly in the well through the interior of the interior conduit to the well surface while testing the seal.

Other and further objects, features and advantages will be apparent from the following description of presently preferred embodiments, given for the purpose of disclosure and taken in conjunction with the accompanying drawings.

BRIEF DESCRIPTION OF THE DRAWINGS

FIG. 2 is an enlarged perspective elevational view, partly in cross section, illustrating another form of the present invention monitoring the annulus pressure in the wellhead, FIG. 3 is a cross-sectional view taken along the line 3—3 of FIG. 2.

DESCRIPTION OF THE PREFERRED EMBODIMENT

Figures 1, 1A:
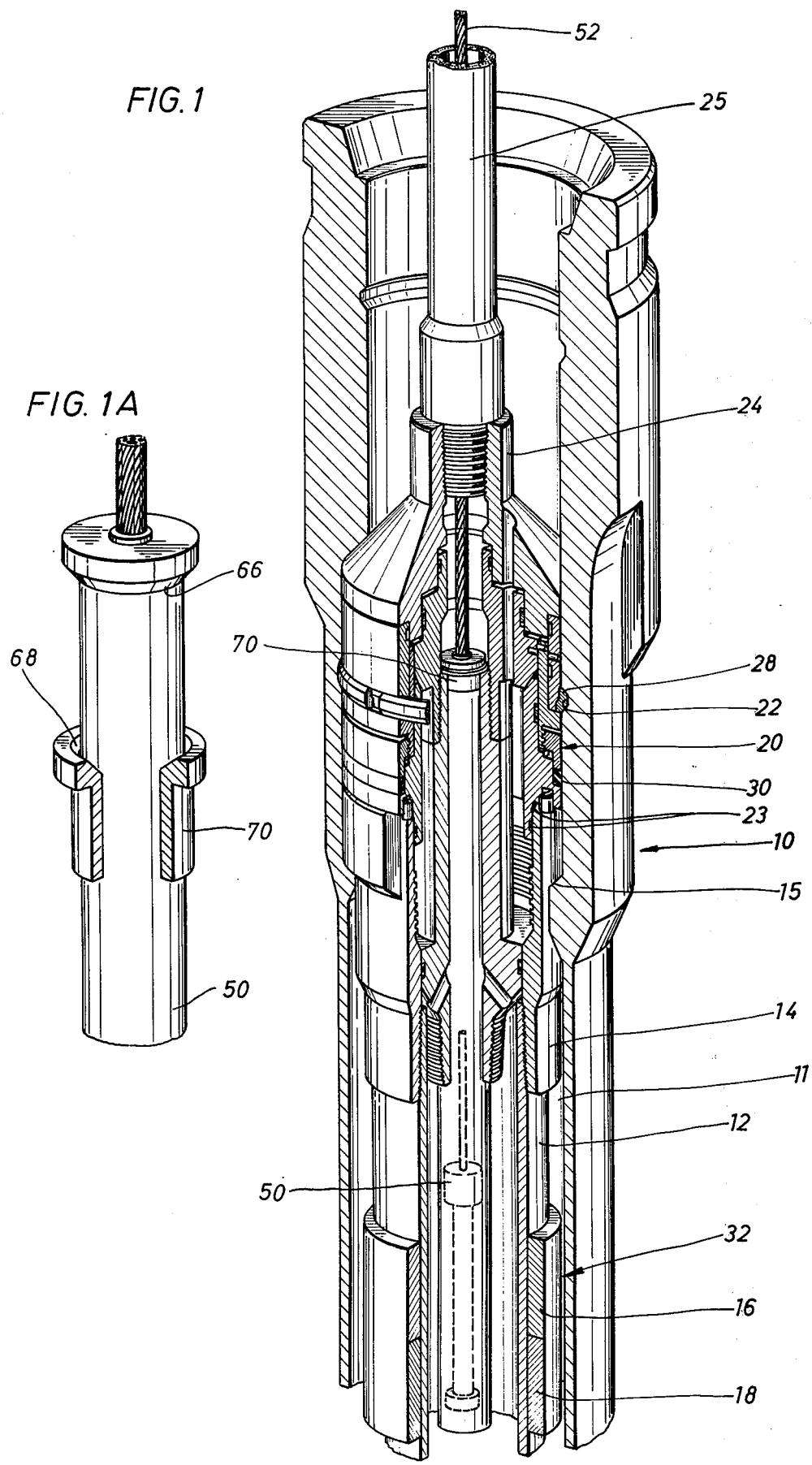
FIG. 1 is a perspective elevational view, partly in cross section, of a wellhead utilizing one form of the present invention.
FIG. 1A is an enlarged perspective elevational view, partly in cross section, illustrating a landing bushing for positioning the measuring and transmitting sensor relative to the pressure measuring means.

While the present invention is useful in monitoring the annulus pressure in various types of well installations, the present invention will be described in connection with a wellhead unit such as described in U.S. patent application Ser. No. 449,698, filed Mar. 11, 1974. Referring to FIG. 1, a conventional wellhead generally indicated by the reference numeral 10 is shown in which a casing 12 is positioned coaxially therewith and supported from a conventional fluted hanger 14 by a shoulder 15 in the wellhead 10. A sealing assembly generally indicated by the reference numeral 20 is used for sealing off the annulus 11 between the wellhead 10 and the casing hanger 14 and casing 12 by being locked into a locking notch 22 after being run into the wellhead 10 by means of a running and testing tool 24 which is supported from pipe 25. The seal assembly 20 includes spring-acting locking dog 28 which is locked into the locking notch 22 and includes a seal 30 which is squeezed into a set position in the annulus 11 for preventing fluid flow therethrough and seal 23 to seal on the internal portion of hanger 14. To test the seals 30, and 23, pressure is pumped down into the annulus between the wellhead 10 and the pipe 25 supporting the testing tool 24. If the pressure builds up and remains steady, as measured from the surface, the seals 30 and 23 are good. However, if either the seal 30 or 23 is not properly set, fluid will leak past the seals 30 or 23 into the annulus 11 below the seals 30 and 23. If either of the seals 30 or 23 is leaking, then the pressure being applied to the top of the seal 30 or 23 does not build up but escapes into the annulus 11 below the seals 30 and 23 and may collapse the casing 12 before the test operator realizes that the seal 30 or 23 is leaking. For a more complete description of the wellhead and testing operation, see copending patent application Ser. No. 449,698, filed Mar. 11, 1974.

The present invention is directed to a method and apparatus for monitoring the pressure in the annulus 11 between the wellhead 10 and the casing 12, particularly while testing the seals 30 and 23, in order to avoid excessive pressure in the annulus 11 below the seals by stopping the test in the event that the pressure therein exceeds a predetermined amount but still being able to apply full pressure safely to the seals 30 and 23, if the seal holds, for maximum testing without collapsing the casing 12. A pressure measuring means, generally indicated by the reference numeral 32, is provided in the annulus 11 which is movable in response to pressure in the annulus 11. The pressure measuring means may consist of any suitable means for directly measuring the pressure in the annulus 11 such as a conventional switch actuated pressure transducer 16 which will be actuated at a given pressure at some value below the rated collapse pressure of the casing 12, and signaling means such as a conventional acoustical transmitter 18 which is actuated by the pressure transducer 16. Sensor means 50 may be provided for monitoring the pressure in the annulus 11 by any suitable receiving or transmitting signals, such as acoustical, electromagnetic or radioactive signals, and transmitting a signal to the well surface through a control cable 52. As shown in FIG. 1, the sensor means 50 may be a conventional acoustical receiver.

Referring now to FIG. 2, another form of the present invention is shown in which the pressure measuring means 32a may include a chamber 34 having upper seals 36 and lower seals 38 and a movable element 40. Preferably, the chamber 34 is pressure charged through a dill valve 43 to urge the element 40 in one direction which is limited by stop means 44. The pressure in the chamber 34 is charged to some pressure below the rated collapsed pressure of the casing 12 so that an increase in pressure in the annulus 11 will act on the element 40 and move it against the pressure charge in the chamber 34 when the pressure in the annulus 11 increased to a point where it is desired to be accurately monitored. Preferably, the chamber 34 and element 40 are annular in order to provide as large a measuring device as possible, since the annulus 11 is generally quite small, thereby providing a sensitive pressure measuring element.

The sensor means 50a is provided for measuring the location of the movable pressure measuring means and transmitting the measured signal to the well surface 50 and is adapted to be moved through the pipe 25, the testing tool 24 and positioned on the interior of the casing 12 adjacent the pressure measuring means 32a on a conventional supporting and control cable 52a. The sensor means 50a may include a sensor head or element 54 for sensing the location of the element 40 and transmitting the measurement to the well surface through the control cable 52a. Any suitable type of sensing system may be used. For example, the element 40 may include an enlarged head 42, and the sensing head 54 may acoustically or electromagnetically sense the position of the enlarged head 42. Or, the enlarged head 42 may be radioactive and the sensing head 54 may include a suitable radioactive detector.

Referring now to FIGS. 2 and 3, the sensor head 54 is best seen monitoring the location of the movable element 40. The sensor head 54 is connected to a lead screw 56 which is driven by a motor 58. The sensor head 54 may include guide ears 60, moving in slots 62 of the housing 64 whereby rotation of the lead screw 56 will raise and lower the sensor head 54 so it may vertically scan and determine the position of the enlarged head 42 which is an indication of the pressure in the annulus 11. As shown in dotted outline, upon an increase in the annulus 11, the head 42 has moved upwardly and by actuation of the motor 58 through the control cable 52a, the sensor head 54 has traversed upwardly to obtain the maximum signal thereby locating the position of the enlarged head 42. By measuring the output of the sensor head 54 through a lead 63 and measuring the rotation of the stepping motor 58, both connected through control cable 52a to the well surface, the position of the enlarged head 42 may be determined from the well surface during the testing of the seal 30. It is noted that the sensor 50 may include a stop shoulder 66 which seats on a seat 68 of a bushing 70 (FIG. 1A) in the testing tool 24 thereby accurately locating the vertical position of the sensor 50 so as to allow an accurate measurement of the position of the enlarged head 42.

Figure 4:
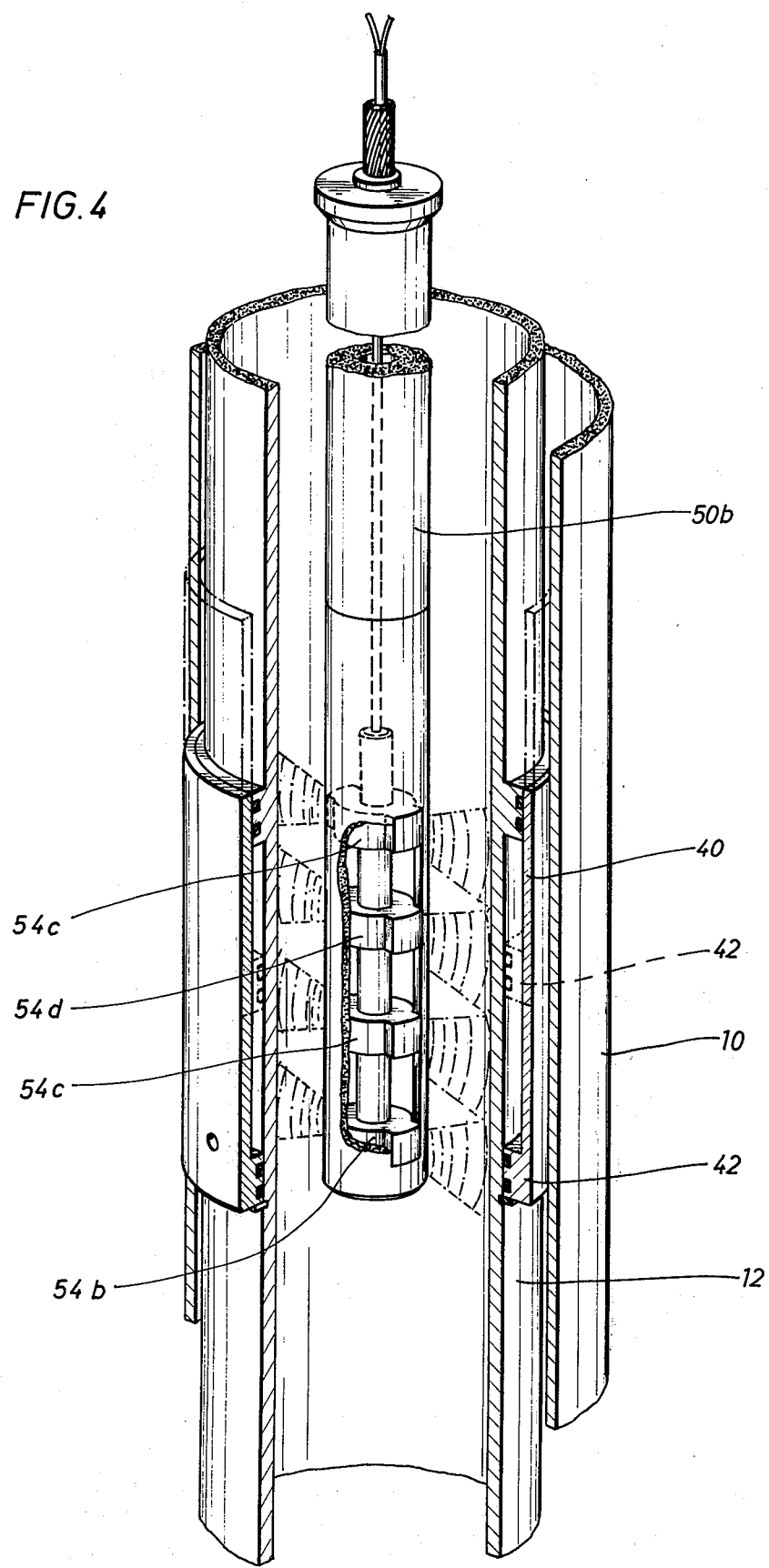
FIG. 4 is an enlarged fragmentary perspective elevational view, partly in cross section, illustrating a modified type of sensor.

Referring now to FIG. 4, a modified sensor 50b is shown which, instead of having a single sensing head which vertically scans the pressure measuring means 40b for determining its position, utilizes a plurality of fixed sensing heads 54b, 54c, 54d and 54e, all of which scan continuously in a horizontal direction. Therefore, the location of the enlarged head 52 is determined by the strength of the signals measured by one or more of the sensing elements 54b, 54c, 54d and 54e.

Figure 5:
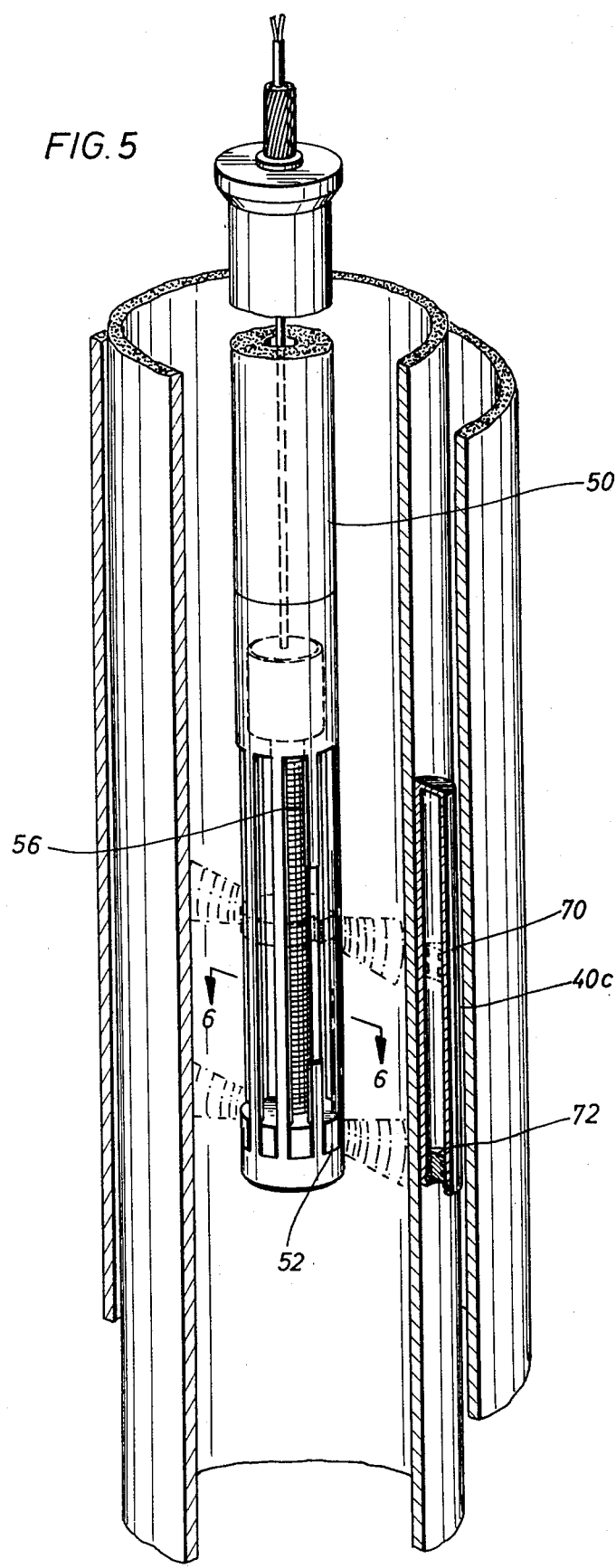
FIG. 5 is an enlarged fragmentary perspective elevational view, partly in cross section, of a modified structure of the present invention.
Figure 6:
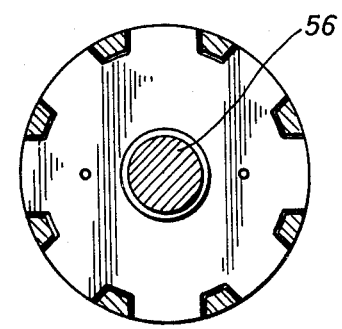
FIG. 6 is a cross-sectional view taken along the line 6—6 of FIG. 5.

Referring to FIGS. 5 and 6, a still further modification is shown in which the pressure measuring means 40c is a single pre-charged cylinder 70 having a movable piston 72 therein whose position is detected by the sensor 50c, here shown as having a single sensing element 52 which is vertically moved by the lead screw 56.

The method of the present invention is apparent from the foregoing description of the apparatus, but the method comprehends monitoring the annulus pressure between two coaxial conduits below a packoff seal which blocks the flow through the annulus, while testing the seal by applying fluid pressure to the top of the packoff seal, in order to avoid excessive pressure in the annulus below the seal by measuring the pressure in the annulus below the seal while testing the seal, and transmitting the pressure measurement to the well surface while testing the seal. The method also comprehends transmitting the measured pressure measurement upwardly to the well surface through the interior of the interior conduit, and measuring the pressure measuring means by positioning the sensor in a predetermined relationship to the movable pressure measuring means.

The present invention, therefore, is well adapted to carry out the objects and attain the ends and advantages mentioned as well as others inherent therein. While presently preferred embodiments have been given for the purpose of disclosure, numerous changes may be made without departing from the spirit and scope of the invention as hereinafter claimed.

What is claimed is:

1. An annulus pressure monitor for measuring the pressure in the annulus between two coaxial well conduits comprising, pressure measuring means movable in response to pressure adapted to be positioned in the well in said annulus, and means for measuring the movement of the pressure measuring means by wave signals and transmitting said measurement to the well surface thereby providing at the well surface an indication of the pressure in the annulus.

2. The apparatus of claim 1 wherein said pressure measuring means includes a movable element exposed to the pressure in the annulus and a pressure charged chamber acting on the element in a direction to move the element opposite to the movement of the element caused by the pressure in the annulus.

3. The apparatus of claim 2 wherein the pressure chamber and the element are annular and surround the exterior of the interior conduit.

4. The apparatus of claim 1 wherein the measuring means includes sensor means for measuring the position of the movable pressure measuring means and is adapted to be moved in the well in the interior of the interior conduit to a position adjacent the pressure measuring means.

5. The apparatus of claim 4 wherein said measuring means includes a stop shoulder for engaging a shoulder in the interior of the interior conduit for placing the measuring means at a predetermined location.

6. The apparatus of claim 5 including a plurality of vertically spaced sensors for measuring the position of the pressure measuring means.

7. The apparatus of claim 5 including means for vertically moving the sensor means for monitoring the position of the pressure measuring means.

8. An annulus pressure monitor for measuring the pressure in the annulus below a packoff seal between two coaxial well conduits comprising, pressure measuring means incuding a movable element positioned in the annulus below said seal and exposed to and movable in response to the pressure in the annulus, and a pressure charged chamber acting on the movable element in a direction to move the element opposite to the movement of the element caused by the pressure in the annulus, and measuring means for measuring the movement of said movable element including means extending from the well surface through the interior of the interior conduit to a position adjacent the element and including means measuring the position of the movable element.

9. A method of monitoring the annulus pressure between two coaxial well conduits below a packoff seal blocking flow through the annulus, while testing the seal by applying fluid pressure to the top of the packoff seal, in order to avoid excessive pressure in the annulus below the seal comprising, placing a pressure measuring means which is movable in response to the annulus pressure in the annulus below the seal, applying a predetermined pressure charge against the movable pressure measuring means acting in a direction to move the pressure measuring means opposite to the movement of the pressure measuring means caused by the pressure in the annulus, placing means for measuring by wave signals the position of the pressure monitoring means in the interior of the interior conduit adjacent the pressure measuring means, and transmitting the pressure measurement up to the well surface through the interior of the interior conduit while pressure testing the seal.

* * * * *